US008864432B2

(12) United States Patent
Figge et al.

(10) Patent No.: US 8,864,432 B2
(45) Date of Patent: Oct. 21, 2014

(54) FASTENING ARRANGEMENT WITH TOLERANCE COMPENSATION

(75) Inventors: Hans-Ulrich Figge, Schloss-Holte (DE); Ingo Burger, Schloss-Holte (DE)

(73) Assignee: Bollhoff Verbindungstechnik GmbH (DE)

( * ) Notice: Subject to any disclaimer, the term of this patent is extended or adjusted under 35 U.S.C. 154(b) by 886 days.

(21) Appl. No.: 13/058,433

(22) PCT Filed: Jul. 29, 2009

(86) PCT No.: PCT/EP2009/005496
§ 371 (c)(1),
(2), (4) Date: Feb. 10, 2011

(87) PCT Pub. No.: WO2010/022841
PCT Pub. Date: Mar. 4, 2010

(65) Prior Publication Data
US 2012/0090146 A1    Apr. 19, 2012

(30) Foreign Application Priority Data
Aug. 28, 2008 (DE) ............... 20 2008 011 318 U (51) Int. Cl.
*F16B 43/02* (2006.01)
*F16B 37/04* (2006.01)
*F16B 5/02* (2006.01)

(52) U.S. Cl.
CPC ............... *F16B 5/025* (2013.01); *F16B 37/042* (2013.01)
USPC ........................................ 411/546; 411/383

(58) Field of Classification Search
CPC ...... F16B 5/025; F16B 5/0233; F16B 5/0283; F16B 25/00; F16B 33/066; F16B 35/00; F16B 37/042; F16B 43/001; E04D 3/3603; B62D 27/065

USPC .............. 29/426.1; 411/366.1, 367, 383, 432, 411/531, 539, 546
See application file for complete search history.

(56) References Cited

U.S. PATENT DOCUMENTS 6,789,993 B2 * 9/2004 Ozawa et al. ................. 411/546
(Continued)

FOREIGN PATENT DOCUMENTS

DE    202006012493 U1   12/2006
DE    102005037192 A1    2/2007
(Continued)

OTHER PUBLICATIONS

International Search Report and Written Opinion of Intl. Searching Authority dated Aug. 28, 2008, App. No. PCT/EP2009/005496.

*Primary Examiner* — Roberta Delisle
(74) *Attorney, Agent, or Firm* — Seyfarth Shaw LLP (57) ABSTRACT

The invention relates to a fastening arrangement for fastening a component B to a component A with automatic compensation of tolerances with a spacing (S) between the component B and the component A, which comprises the following features: a.) a receiving element (10) and an adjusting element (20, 30) which can be screwed to the receiving element (10) via a first thread pair (12, 32) having a first pitch direction, while b.) a fastening screw (40) can be inserted through an opening in the receiving element (10) and adjusting element (20, 30) which screw can be screwed into the receiving element (10) via a second thread pair (42, 52) having a second pitch direction opposite to the first and can be connected to the adjusting element (20, 30) by a releasable drag connection (24) in order to co-rotate the adjusting element (20, 30) during the rotation of the fastening screw (40) and thereby move it into contact with the component B, and wherein c.) the adjusting element (20, 30) comprises a drag element (20) which is arranged in a rotationally fixed and floating manner inside a thread element (30), thus making it possible to compensate for a misalignment of the fastening screw (40) during insertion into the adjusting element (20, 30).

14 Claims, 6 Drawing Sheets

(56) References Cited

U.S. PATENT DOCUMENTS

| | | | |
|---|---|---|---|
| 7,891,927 B2 * | 2/2011 | Burger et al. | 411/546 |
| 8,066,465 B2 * | 11/2011 | Figge et al. | 411/546 |
| 8,202,033 B2 * | 6/2012 | Choi et al. | 411/546 |
| 2007/0092355 A1 * | 4/2007 | Burger et al. | 411/535 |
| 2008/0038090 A1 * | 2/2008 | Figge et al. | 411/433 |

FOREIGN PATENT DOCUMENTS

| | | |
|---|---|---|
| DE | 202007008152 U1 | 9/2007 |
| DE | 202007008154 U1 | 10/2007 |
| DE | 102006034463 B3 | 1/2008 |
| DE | 102007037242 A1 | 2/2008 |
| EP | 1780424 A1 | 5/2007 |

* cited by examiner

FASTENING ARRANGEMENT WITH TOLERANCE COMPENSATION

RELATED APPLICATION(S)

This application is a U.S. National Phase of International Patent Application Serial No. PCT/EP2009/005496, filed Jul. 29, 2009, which claims priority to German. Patent Application No. 20 2008 011 318.0, filed Aug. 28, 2008.

The present invention relates to a fastening arrangement for fastening a component B to a component A having automatic compensation of spacing tolerances between the two components.

A wide variety of such fastening arrangements having tolerance compensation is known. They are typically composed of an adjusting bushing having a so-called drag section that can form a frictional engagement connection to a fastening screw. When rotating the fastening screw, therefore, the adjusting bushing is also rotated until it rests at one of the two components, whereupon during further rotation of the fastening screw and with corresponding increase of the torque the frictional engagement connection is overcome, so that the two components can be clamped together by the fastening screw via the adjusting bushing.

Such a tolerance compensation arrangement is known from the European patent application EP 1 780 424. This arrangement comprises an integrally formed receiving element and an integrally formed adjusting element. The receiving element has a fastening section having a self-tapping and/or self-forming thread that can be screwed into the one component for producing a screw connection, wherein the screw connection is a plastic in plastic screw connection.

The object of the present invention is to further develop a fastening arrangement having automatic tolerance compensation of the specified type that simplifies the assembly of the fastening arrangement.

The fastening arrangement according to the present invention is defined in claim 1. In addition, the present invention relates to a method for inserting and fastening a receiving element of the fastening arrangement according to claim 13, and a method for removing the receiving element from the component according to claim 14.

The fastening arrangement serves for fastening a component B to a component A having automatic compensation of the tolerances in the spacing between the component B and component A. The fastening arrangement according to the invention comprises the following features: a receiving element and an adjusting element, that can be screwed to the receiving element via a first thread pair having a first pitch direction, while a fastening screw can be inserted through an opening in the receiving element and the adjusting element and can be screwed into the receiving element via a second thread pair of a second pitch direction, opposite to the first direction, and can be connected to the adjusting element by a releasable drag connection, in order to co-rotate the adjusting element during the rotation of the fastening screw and thereby move it into contact with the component B, and the adjusting element of the fastening screw is composed of a drag element disposed in a rotationally fixed and floating manner inside a thread element so that a misalignment of the fastening screw during insertion into the adjusting element can be compensated.

The adjusting element in the fastening arrangement according to the invention is constructed in two-pieces. This two-piece construction composed of thread element and drag element guarantees a compensation of assembly errors during insertion of the fastening screw into the fastening arrangement. Because the drag element is disposed floating within the thread element, it can perform radial and lateral compensation movements within the thread element relative to its longitudinal axis. With a corresponding design of the thread element and drag element there is preferably also the possibility that an angular compensation movement is performed by the drag element within the thread element. This means that the longitudinal axis of the drag element can assume a non-parallel, inclined position relative to the longitudinal axis of the thread element. Based on this constructive foundation, the fastening screw can be inserted into the fastening arrangement with a certain orientation inaccuracy without the fastening screw being jammed within the fastening arrangement. In addition, the tolerance compensation is not impacted by the fastening arrangement due to the incorrectly oriented fastening screw, because the drag element can follow the incorrect orientation of the fastening screw within the thread element. Thus, even during rotation of the fastening screw the drag element is also advanced to the component B.

According to a preferred design of the fastening arrangement, an inner channel of the thread element encompasses the drag element such that the drag element is displaceable laterally within the thread element, particularly in a radial direction relative to the thread element. In addition, or alternatively it is preferred that the inner channel of the thread element is at least partially tapered along its axial direction so that the drag element is disposed within the thread element axially tilted relative to the longitudinal axis of the thread element.

The thread element of the fastening arrangement is equipped with an inner channel formed corresponding to the requirements. This inner channel comprises a cylindrical shape with an inner diameter that is formed larger than the area of the drag element it is to receive, for example. This guarantees that due to the floating mounting of the drag element within the thread element, the drag element is shiftable within the inner channel in the radial direction relative to the thread element. In this way, the incorrect orientations of the fastening screw already mentioned above can be compensated. According to a further design, a compensation of incorrect angular orientations of the fastening screw is also possible through an angular orientation of the drag element. In this alternative, the inner channel tapers at least in a partial area so that it comprises a conical contour. Following the conical contour, the drag element can compensate an incorrect orientation of the fastening screw so that way also, a simplified installation of the fastening arrangement is supported.

The drag element preferably comprises at least one retaining lug projecting in a radial direction that can be latched into an indentation of the thread element for guaranteeing the rotationally fixed connection between the drag element and thread element.

In addition, in a further embodiment the drag element comprises an oval-shaped transport lock whose at least one projection extending radially outward can be locked at an inner side of the receiving element. This oval-shaped transport lock is formed according to one embodiment such that during passage of the fastening screw through the oval-shaped transport lock the at least one projection extending radially outward can be unlocked from the inside of the receiving element by a radially inward directed deformation movement of the transport lock. The oval shape of the transport lock is thus adapted to the diameter of the fastening screw so that the area of the oval that is smaller in diameter is smaller than the diameter of the fastening screw, and that the area of the oval that is larger in diameter is larger than the diameter of the fastening screw. Through this dimensioning of the oval-shaped transport lock and the fastening screw, the fastening screw during insertion into the oval-shaped transport lock presses the smaller area apart and in this manner pulls the wider area of the oval together so that the transport lock deforms into a nearly round shape. This deformation movement moves the locking projection away from the inside of the receiving element, so that the adjustment element composed of drag element and thread element can be rotated within the receiving element.

According to a further design of the present fastening arrangement, the drag element comprises two drag webs disposed opposite from each other and extending in the axial direction of the drag element that, projecting elastically radially inward constrict a through opening for the fastening screw. The drag webs are preferably constructed arc-shaped. They connect the oval-shaped transport lock to a bearing section of the drag element.

As already mentioned above, the fastening screw can be screwed into a thread of the receiving element. According to one embodiment, this thread of the receiving element is provided by a nut that can be inserted into a retaining chamber of the receiving element. The nut is fastened in this retaining chamber by clamping, for example. In adaptation to the fastening screw it is conceivable that that nut and the fastening screw each comprise a metric thread matched to each other.

Further advantageous designs of the invention arise from the following description, the drawings and the dependent claims.

Exemplary embodiments of the invention are explained in more detail using the figures. They show:

FIG. 1 a sectional representation through the preferred fastening arrangement without fastening screw, FIG. 2 a sectional representation through the preferred fastening arrangement with fastening screw, and installed between components A and B, FIG. 3 *a* and *b* a perspective view of the drag element, FIG. 4 *a* and *b* a perspective view of the thread element, FIG. 5 *a* and *b* a perspective view of the adjusting element comprised of thread element and drag element, FIG. 6 a lateral view of the fastening arrangement, FIG. 7 a section along the line A-A from FIG. 6, FIG. 8 a section along the line B-B from FIG. 6, FIG. 9 a view from below of the adjusting element composed of drag element and thread element, FIG. 10 a view from above of the adjusting element composed of drag element and thread element, FIG. 11 a section along the line A-A from FIG. 10, FIG. 12 a section along the line B-B from FIG. 10, FIG. 13 *a* to *c* an assembly sequence of the fastening arrangement with a nut, and FIG. 14 *a* to *c* an installation sequence of the fastening arrangement in a key hole in the component A.

Figure 1:
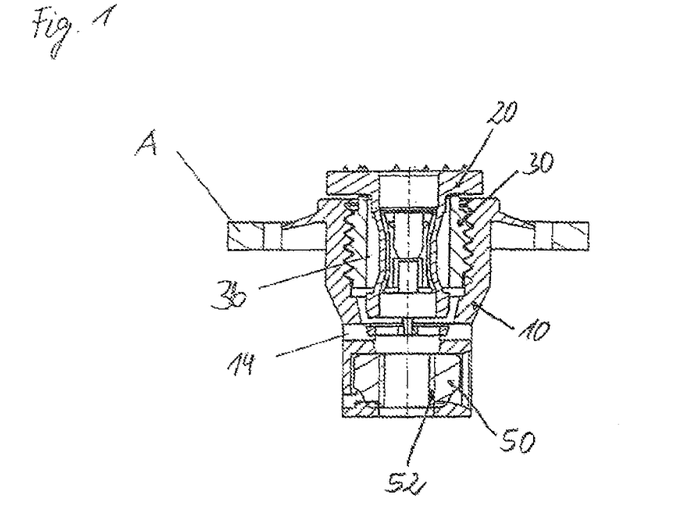

As shown in FIG. 1, the fasting arrangement is composed of a receiving element 10 and an adjusting element 20, 30. The receiving element 10 and the adjusting element 20, 30 are connected together via a first thread pair 12, 32. The one thread 12 of the first thread pair is located on the inside of the receiving element 10. The other thread 32 is located on the outside of the thread element 30 that together with a drag element 20 forms the adjusting element 20, 30.

Figure 2:
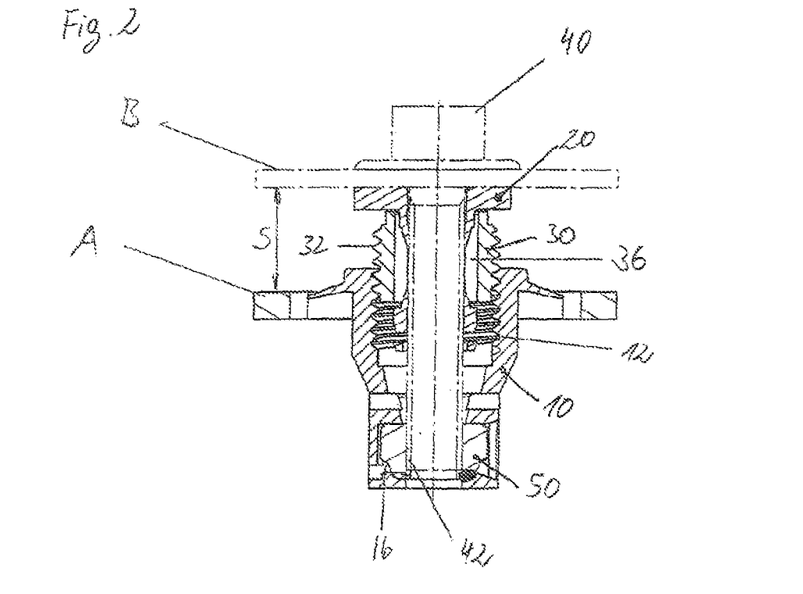

FIG. 2 shows a sectional representation of the fastening arrangement installed between the components A and B. Through screwing a fastening screw 40 into the fastening arrangement, the fastening arrangement is lengthened so far until a space S between the components A and B is compensated. During screwing in the fastening screw 40 into a thread 52 of the receiving element 10, the adjustment element 20, 30 is unscrewed from the receiving element 10. This automatic adjusting movement of the fastening arrangement is based on the fact that the thread pair of a thread 42 of the fastening screw 40 and a thread 52 of the receiving element 10 has an opposite pitch direction to that of the thread pair 12, 32.

The thread 52 of the receiving element 10 is preferably provided using a nut 50. The nut 50 is disposed in a retaining chamber 16 of the receiving element 10. The nut 50 is held in the retaining chamber 16 preferably by a press fit between the walls, or a retaining web and the walls of the retaining chamber 16, or by the connection to the fastening screw 40. According to one embodiment of the present invention, the threads 42 and 52 are metric threads matched to each other. In comparison to the prior art, the advantage of a fastening screw 40 with metric threads consists in that with the metric screw connection the thread 42 can be extended through the drag element 20. As a result, pressure applied by the operator on the fastening screw 40 during the screw procedure does not influence the function of the fastening arrangement. The fastening screw 40 can be extended into the fastening arrangement up to the nut 50. From this moment on, all pressure forces are transferred directly via the thread 52 to the nut 50.

According to a further embodiment, not represented, it is also preferred to insert a fastening screw 40 having a self-cutting thread 42. This fastening screw would fasten itself within an opening of an end area of the receiving element 10 that is constructed in lieu of the retaining chamber 16.

Figure 3A:
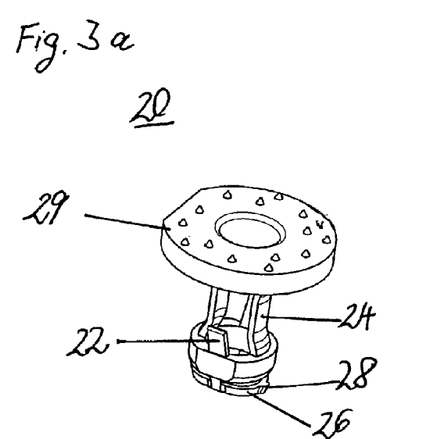
Figure 3B:
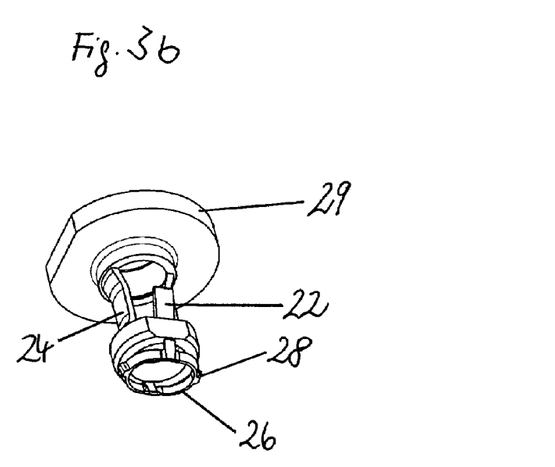

The adjusting element 20, 30 is composed of the thread element 30, in whose interior chamber 36 the drag element 20 is disposed. The drag element 20 is shown in the FIGS. 3*a, b*. The drag element 20 comprises a bearing section 29 for the contact with the component B. The bearing section 29 has elevations in the direction of the component B that dig into component B. In this manner a positive locking forms between the bearing section 29 and the component B, and with it, an improved hold results between the fastening arrangement and the component B. In addition, the bearing section 29 has a central opening through which the fastening screw 40 is inserted.

Beneath the bearing section 29, at least two drag webs 24 extend in an axial direction of the drag element 20. The drag webs 24 are disposed opposite each other. In addition, they comprise an arc-shaped progression so that, extending elastically radially inward, they constrict a through area of the fastening screw 40 by the drag element.

The drag webs 24 are connected together by a ring-shaped structure at their ends facing away from the bearing section 29. At least one retaining lug 22 that projects outward in a radial direction is disposed at the ring-shaped structure. The retaining lug 22 engages in an indentation 34 matched to it, at the opposite inside of the thread element 30. As the retaining lug 22 latches in the indentation 34, a rotationally fixed connection results between the drag element 20 and the thread element 30. Preferably two retaining lugs 22 are disposed offset by 90° from the drag webs 24.

In order to guarantee an easier and positionally accurate insertion of the drag element 20 into the thread element 30, guide grooves 38 for the retaining lugs 22 are formed at the inside of the thread element 30. When the drag element 20 is inserted at the thread element 30, the retaining lugs 22 slide along the guide grooves 38 and then latch into the indentations 34. This is illustrated in the FIGS. 8, 9, 11, and 12.

Figure 6:
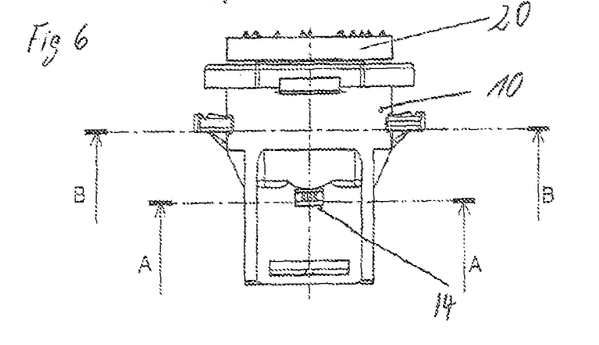
Figure 7:
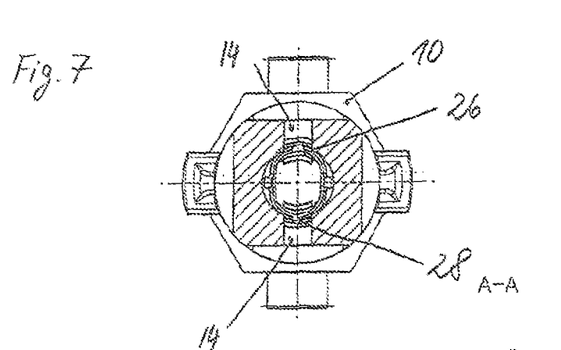
Figure 8:
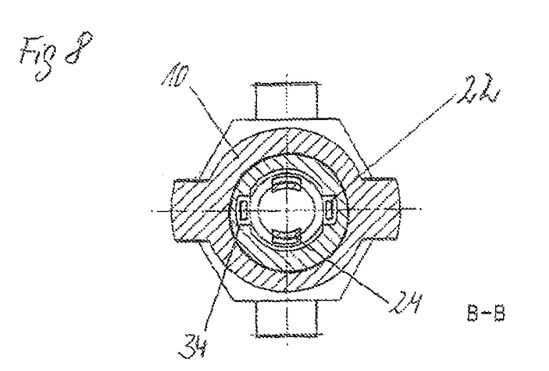
Figure 9:
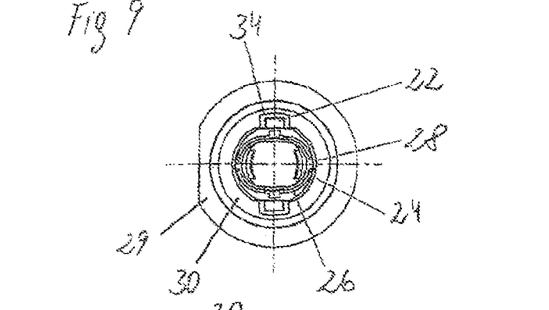
Figure 10:
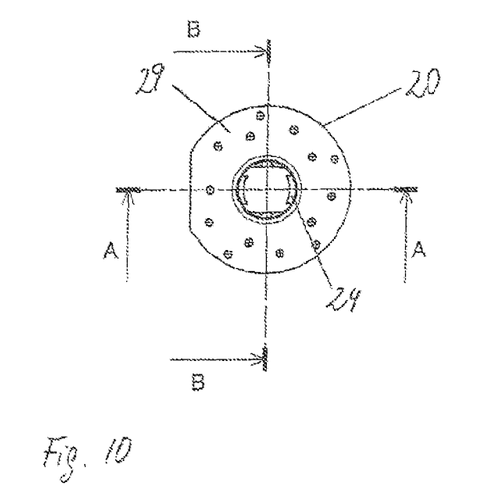
Figure 11:
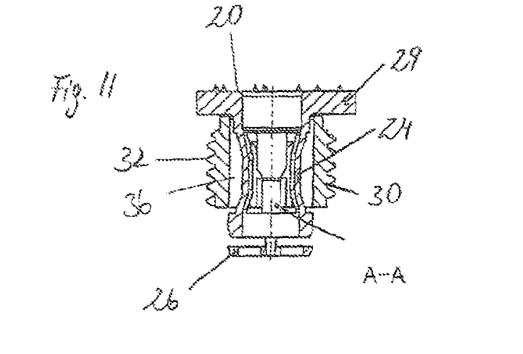

The inner channel 36 of the thread element 30 has a larger diameter than the part of the drag element 20 that is to be received in the inner channel 36. In the same manner, the indentations 34 are constructed larger in the lateral direction than the retaining lugs 22 to received, so that these can move therein. The over dimensioning of the inner channel 36 and the indentations 34 in comparison to the drag element 20 lead to a floating mounting of the drag element 20 at the thread element 30. On this basis, during insertion of the fastening screw 40 the drag element 20 can be displaced floating in the radial direction, thus laterally, within the thread element 30, in order to compensate misalignment of the fastening screw 40. In FIG. 8, in the section along the line B-B from FIG. 6, it can be seen that the installation of the fastening screw 40 is guaranteed despite an off centered arrangement of the drag element 20.

Figure 4A:
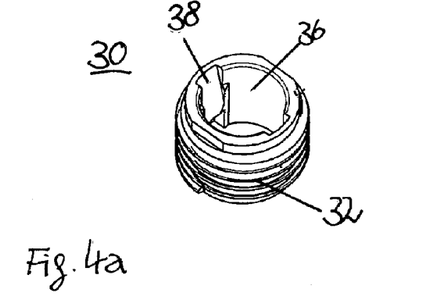
Figure 4B:
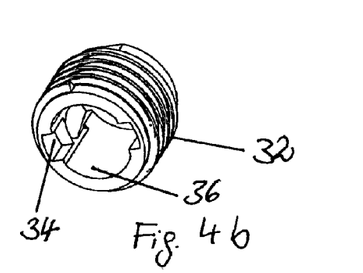
Figure 5A:
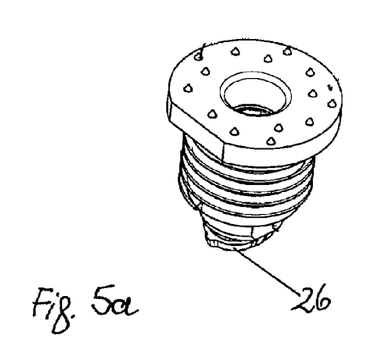
Figure 5B:
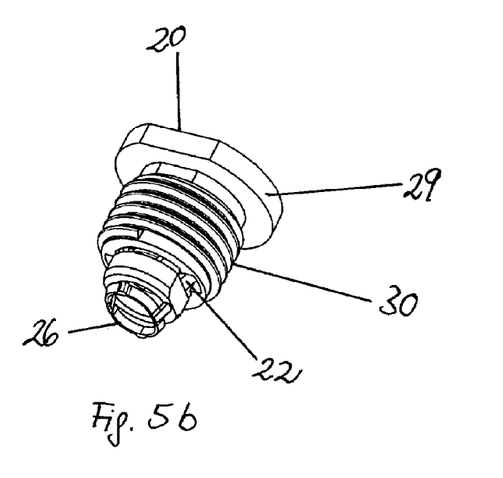

According to a further embodiment, not represented, the inner channel 36 has an at least partially conical shape instead of the cylindrical shape in FIG. 4 a, b. The conical shape progresses such that the area of the inner channel 36 having the largest diameter borders on the bearing section 29 of the drag element 20. The conical shape of the inner channel 36 guarantees a tilting of the drag element 20 within the thread element 30. In this manner, the drag element 20 can be disposed within the thread element 30 tilted axially with respect to the longitudinal axis of the thread element 30. For this purpose, the inner channel 36 tapers, for example, conically starting at the bearing section 29 up to its end near the indentations 34. It is also conceivable that the inner channel 36 is constructed as a double cone that tapers starting at both ends of the inner channel 36 in the direction to a point near the center of the inner channel.

Using the above described constructions, a floating arrangement of the drag element 20 in the thread element 30 is implemented, through which the drag element 20 is disposed so that it can be displaced laterally and/or tilted axially in relation to the thread element 30.

According to a further preferred embodiment, the fastening arrangement comprises a transport lock 26. This prevents a loosening of the fastening arrangement in the preassembled state. The transport lock 26 is disposed adjacent to the ring-shaped structure of the drag element 20. It is formed by an oval-shaped ring 26 that is preferably fastened by means of webs at the ring-shaped structure of the drag element 20.

The oval-shaped transport lock 26 comprises an area of larger diameter and an area of smaller diameter. The oval-shaped transport lock 26 is dimensioned so that the smaller diameter is smaller than the diameter of the fastening screw 40 and that the larger diameter is larger than the diameter of the fastening screw 40. Based on this dimensioning, during screwing the fastening screw into the drag element 20, the oval-shaped transport lock 26 is pressed open. This opening of the area of smaller diameter occurs at the expense of the area of larger diameter so that after the fastening screw 40 is screwed in, the oval-shaped transport lock 26 has a nearly circular shape.

At least one radially outward extending projection 28 is disposed in the area of the larger diameter of the transport lock 26. For producing a transport lock, the projection 28 engages in channels, windows or indentations 14 at the inside of the receiving element 10. If the fastening screw 40 is screwed into the oval-shaped transport lock 26, the area of smaller diameter is expanded, whereas simultaneously the area of larger diameter is reduced in its diameter. This creates a radially inward directed deformation movement of the area of larger diameter so that the at least one projection 28 is released from locking in the channel 14. After this occurs, a displacement of the adjustment element 20, 30 can take place by means of rotating the fastening screw 40.

It is also conceivable to loosen the oval-shaped transport lock 26 from outside by means of the channels 14. Via the channels 14 through the receiving element 10, the projections 28 are accessible from outside and can be pressed radially inward. This can occur for example by a tool matched to it. With this procedure it is not necessary that this function is implemented using the fastening screw 40.

Figure 12:
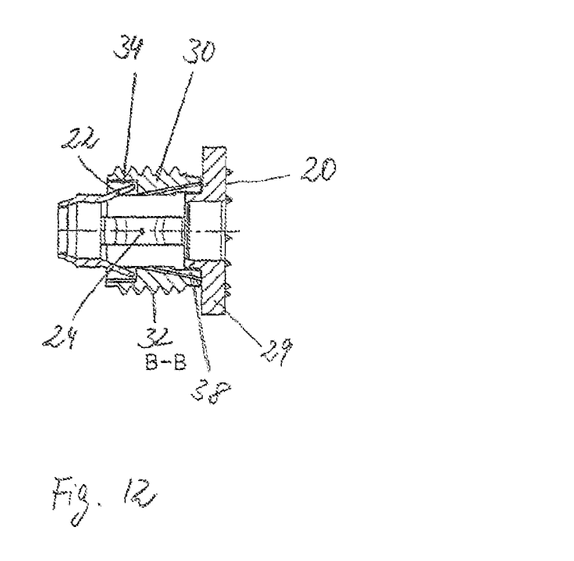
Figures 12B, 13A:
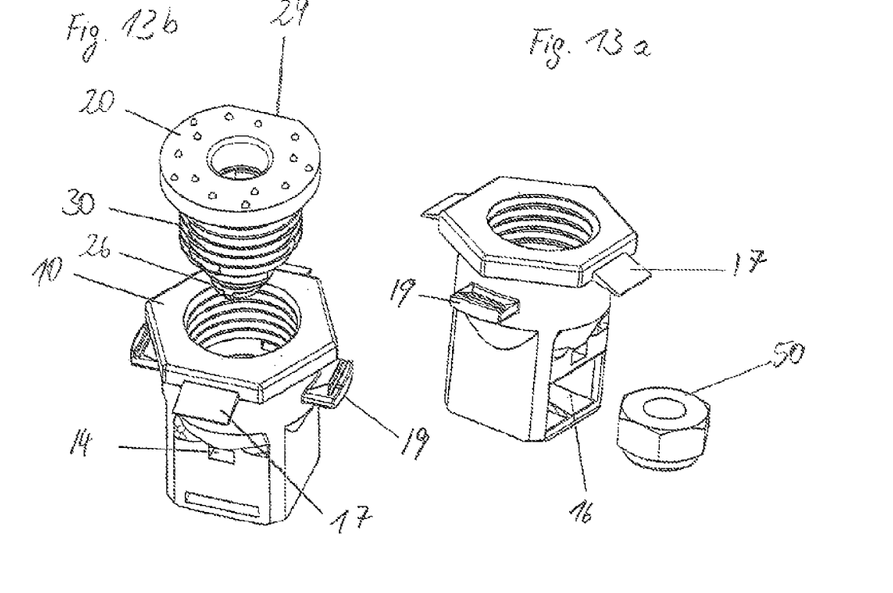
Figure 13C:
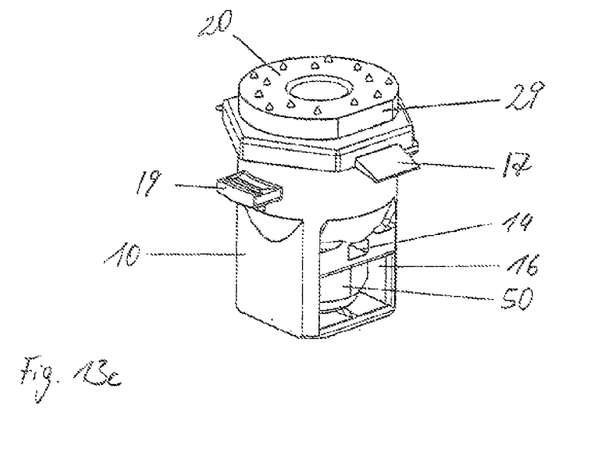

The FIGS. 13 a to c show the production of the fastening element in the pre-mounted state. For this purpose, the nut 50 is inserted into the retaining chamber 16. After that, the adjusting element 20, 30 is screwed into the receiving element 10 until the oval-shaped transport lock 26 holds the adjusting element 20, 30 in the receiving element 10. After this step is completed, the pre-mounted fasting arrangement is available, as is shown in FIG. 13 c.

Figure 14A:
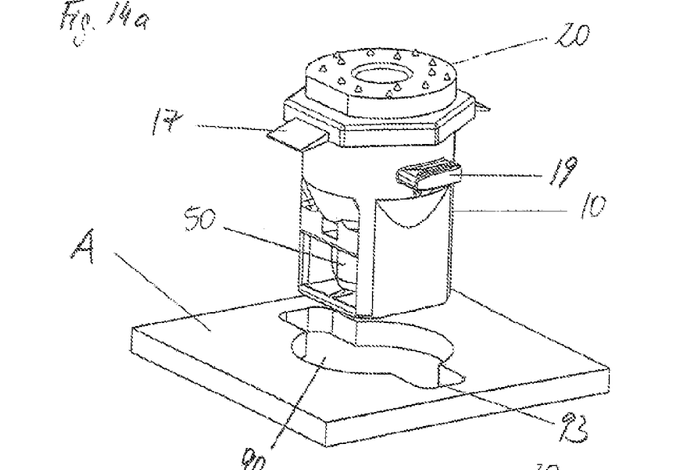

The components A and B are preferably composed of plastic. The component A is composed of a glass fiber reinforced PP, for example, whereas the component B is composed of a softer plastic, a PP with talcum, for example. It is also preferred to produce the component A from metal or another material. As seen in FIG. 14 a, the component A comprises a keyhole 90 into which the receiving element 10 can be received and fastened. The keyhole 90 is constructed nearly complementary to the silhouette of the receiving element 10 within a first radial plane. Two retaining projections 19, for example, lie in the first radial plane. If a different number of retaining projections 19 is provided, the shape of the keyhole 90 is matched accordingly in order to guarantee an insertion of the receiving element 10 into the keyhole 90. In addition, the inner diameter of the keyhole 90 is smaller than the outer diameter of an upper flange or edge of the receiving element 10, so that the receiving element 10 can be retained in component A in a positive locking manner.

After the insertion of the receiving element 10 in the keyhole 90 in a suitable alignment, a spring element 17 and the flange of the receiving element 10 are disposed above the component A and the retaining projection 19 is disposed beneath the component A. If the receiving element 10 is pressed in the direction of the component A and subsequently rotated about its longitudinal axis, the retaining projections 19 are moved away from the openings 93 for the insertion. Due to this rotation, a positive locking connection forms between the component A and the receiving element 10.

Figure 14B:
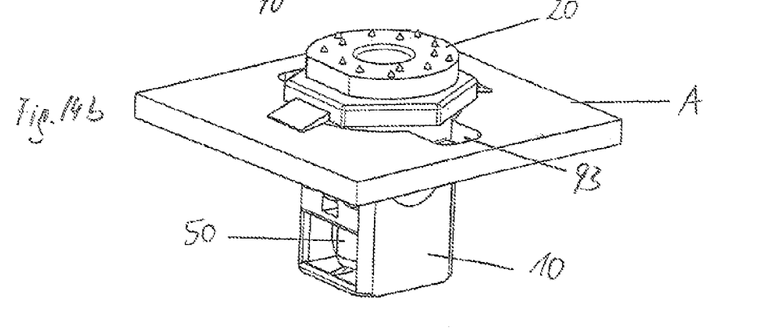
Figure 14C:
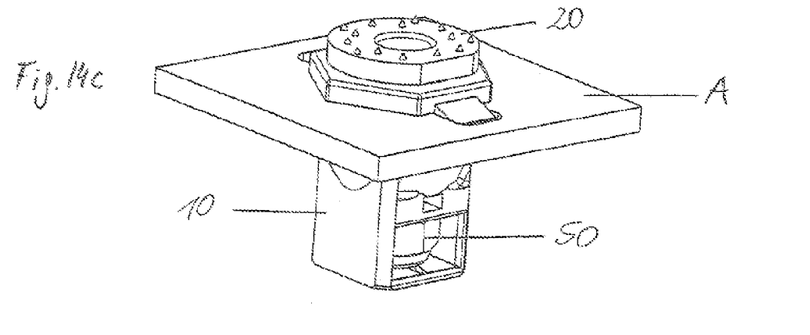

As seen in FIG. 14 a, the spring element 17 and the retaining projection 19 are disposed circumferentially, offset from each other by 90°. Other angular arrangements that can be implemented in coordination with the component A, are also conceivable. After insertion of the receiving element 10 in the keyhole 90, wherein the retaining projections 19 are in alignment with the opening 93, as shown in FIG. 14b, the receiving element 10 is rotated about its longitudinal axis. The receiving element 10 is preferably rotated about its longitudinal axis by an angle of 90°, so that the spring elements 17 that are prestressed by the surface of component A, snap into the openings 93 (see FIG. 14c). It is also possible to provide indentations or locking openings on/in the surface of the component A that are not identical to the insertion openings 93 of the retaining projections 19. In this case, the indentations or locking openings (not shown) only serve for the locking/snapping in of the spring elements 17 and not for the insertion of the retaining projections 19.

The spring elements 17 are represented in FIG. 14c in the locked state. In this state, the component A is clamped between the flange of the receiving element 10 in the retaining projection 19 so that a positive locking and force locking connection is present between component A and the receiving element 10.

Summarizing the above description, the insertion and fastening of the receiving element in the component A can be described by following steps: a) aligning the keyhole 90 and receiving element 10 to each other, b) inserting the receiving element 10 into the keyhole 90, c) rotating the receiving element 10 about its longitudinal axis so that the component A is held between the flange and the retaining projection 19. In the same manner, the removal of the receiving element 10 can be summarized by the following steps: a) rotating the receiving element 10 about its longitudinal axis, whereby locking spring elements 17 are removed, b) aligning the receiving element 10 to the keyhole 90, and c) removing the receiving element 10 from the keyhole 90.

The invention claimed is:

1. A fastening arrangement for fastening a component B to a component A having an automatic compensation of tolerances in the spacing between the component B and component A that comprises the following features:
   a. a receiving element and an adjusting element that can be screwed to the receiving element via a first thread pair, having a first pitch direction, while
   b. a fastening screw can be inserted through an opening in the receiving element and adjusting element, which screw can be screwed into the receiving element via a second thread pair of a second thread direction opposite to the first, and can be connected to the adjusting element by a releasable drag connection, in order to co-rotate the adjusting element during the rotation of the fastening screw and thereby move it into contact with the component B, and
   c. adjusting element of the fastening arrangement comprises a drag element disposed in a rotationally fixed and floating manner inside a thread element, so that a misalignment of the fastening screw during insertion into the adjusting element can be compensated.

2. The fastening arrangement according to claim 1, in which the drag element due to its floating arrangement can be moved laterally and/or can be tilted axially in relation to the thread element.

3. The fastening arrangement according to claim 1, in which an inner channel of the thread element encompasses the drag element such that the drag element can be moved laterally within the thread element, particularly in a radial direction relative to the thread element, and/or in which the inner channel of the thread element is tapered at least partially along its axial direction so that the drag element can be disposed within the thread element tilted axially relative to the longitudinal axis of the thread element.

4. The fastening arrangement according to claim 1, whose drag element comprises at least one retaining lug projecting in a radial direction that can be latched into an indentation of the thread element.

5. The fastening arrangement according to claim 1, whose drag element comprises an oval-shaped transport lock whose at least one projection extending radially outward, can be locked to an inner side of the receiving element.

6. The fastening arrangement according to claim 5, whose oval-shaped transport lock is constructed so that during passage of the fastening screw through the oval-shaped transport lock the at least one projection extending radially outward can be unlocked by a radially inward directed deformation movement of the transport lock.

7. The fastening arrangement according to claim 1, whose drag element comprises two drag webs disposed opposite each other and extending in the axial direction of the drag element that, projecting elastically radially inward, constrict a through opening for the fastening screw.

8. The fastening arrangement according to claim 7, whose drag webs are constructed arc-shaped and connect the oval-shaped transport lock to a bearing section of the drag element.

9. The fastening arrangement according to claim 1, whose receiving element has a retaining chamber into which a nut having a thread adapted to the fastening screw can be inserted.

10. The fastening arrangement according to claim 1, which has a fastening screw and a nut.

11. The fasting arrangement according to claim 10, in which nut and fastening screw each have a metric thread adapted to each other.

12. A component A in combination with a fastening arrangement according to claim 1, where the component A comprises a keyhole into which the receiving element of the fastening arrangement can be fixed.

13. A method for inserting and fastening a receiving element in a component, that has the following steps:
   a) aligning a keyhole and the receiving element to each other,
   b) inserting the receiving element into the keyhole,
   c) rotating the receiving element about its longitudinal axis so that component A is held between a flange and a retaining projection of the receiving element.

14. A method for removing a receiving element from a component A, that has the following steps:
   a) rotating the receiving element about its longitudinal axis in a keyhole, whereby a locking spring element is removed,
   b) aligning the receiving element to the keyhole, and
   c) removing the receiving element from the keyhole.

* * * * *